(12) United States Patent
Kim et al.

(10) Patent No.: US 8,792,327 B2
(45) Date of Patent: Jul. 29, 2014

(54) METHOD AND APPARATUS FOR TRANSMITTING/RECEIVING A CONTROL FORMAT INDICATOR CHANNEL FOR A RELAY BACKHAUL LINK IN A WIRELESS COMMUNICATION SYSTEM

(75) Inventors: So Yeon Kim, Anyang-si (KR); Han Gyu Cho, Anyang-si (KR); Sung Ho Moon, Anyang-si (KR); Gyu Jin Park, Anyang-si (KR); Yeong Hyeon Kwon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 13/382,519

(22) PCT Filed: Jul. 14, 2010

(86) PCT No.: PCT/KR2010/004566
§ 371 (c)(1),
(2), (4) Date: Jan. 5, 2012

(87) PCT Pub. No.: WO2011/008018
PCT Pub. Date: Jan. 20, 2011

(65) Prior Publication Data
US 2012/0121028 A1    May 17, 2012

Related U.S. Application Data

(60) Provisional application No. 61/230,111, filed on Jul. 31, 2009, provisional application No. 61/227,076, filed on Jul. 21, 2009, provisional application No. 61/225,548, filed on Jul. 14, 2009.

(51) Int. Cl.
| | | |
|---|---|---|
| *H04J 11/00* | (2006.01) | |
| *H04L 27/00* | (2006.01) | |
| *H04W 28/18* | (2009.01) | |
| *H04L 5/00* | (2006.01) | |
| *H04W 88/08* | (2009.01) | |

(52) U.S. Cl.
CPC ............... *H04L 27/00* (2013.01); *H04L 5/005* (2013.01); *H04W 28/18* (2013.01); *H04W 88/08* (2013.01)
USPC ........... 370/208; 370/315; 370/328; 370/468; 370/477; 370/478; 375/259

(58) Field of Classification Search
CPC ...... H04L 27/2602; H04L 5/005; H04L 27/00; H04W 99/00; H04W 28/18; H04W 88/08
USPC .......... 370/203, 208, 315–330, 468, 476–478
See application file for complete search history.

(56) References Cited

U.S. PATENT DOCUMENTS

| | | | |
|---|---|---|---|
| 5,838,668 A | * | 11/1998 | Okada et al. ................... 370/312 |
| 5,930,241 A | * | 7/1999 | Fried .............................. 370/328 |

(Continued)

OTHER PUBLICATIONS

Nortel Networks, "Control Channel and Data Channel Design for Relay Link in LTE-Advanced", R1-090153, TSG-RAN1 #55bis, Jan. 2009.

(Continued)

*Primary Examiner* — Andrew Chriss
*Assistant Examiner* — Rasha Fayed
(74) *Attorney, Agent, or Firm* — Lee, Hong, Degerman, Kang & Waimey

(57) ABSTRACT

The present invention relates to a method and an apparatus for transmitting/receiving a control format indicator channel for a relay backhaul link in a wireless communication system. According to one aspect of the present invention, a method for transmitting a control format indicator channel for a relay backhaul link in a wireless communication system is configured such that a base station generates a relay physical control format indicator channel (hereinafter, referred to as "R-PCFICH") containing information on a relay physical downlink control channel (hereinafter, referred to as "R-PDCCH") region, and transmits the R-PCFICH through a first OFDM symbol of the R-PDCCH region.

16 Claims, 7 Drawing Sheets

(56) References Cited

U.S. PATENT DOCUMENTS

| | | | |
|---|---|---|---|
| 7,103,031 B2* | 9/2006 | Lee et al. | 370/345 |
| 7,689,215 B2* | 3/2010 | Kwon et al. | 455/434 |
| 8,190,096 B2* | 5/2012 | Rutjes et al. | 455/67.11 |
| 8,223,686 B2* | 7/2012 | Cho et al. | 370/319 |
| 2009/0197630 A1* | 8/2009 | Ahn et al. | 455/522 |
| 2009/0252075 A1* | 10/2009 | Ji et al. | 370/312 |
| 2009/0303953 A1* | 12/2009 | Kang et al. | 370/329 |
| 2010/0008282 A1* | 1/2010 | Bhattad et al. | 370/312 |
| 2010/0041428 A1* | 2/2010 | Chen et al. | 455/522 |
| 2010/0189038 A1* | 7/2010 | Chen et al. | 370/328 |
| 2010/0232546 A1* | 9/2010 | Yu et al. | 375/300 |
| 2010/0303013 A1* | 12/2010 | Khandekar et al. | 370/328 |
| 2011/0096734 A1* | 4/2011 | Damnjanovic et al. | 370/329 |
| 2011/0222491 A1* | 9/2011 | Vajapeyam et al. | 370/329 |

OTHER PUBLICATIONS

Nortel, "Discussion paper on the control channel and data channel optimization for relay link", R1-091384, 3GPP TSG-RAN Working Group 1 Meeting #56bis, Mar. 2009.

NEC Group, "Control Structure for Relay Type 1 nodes", R1-092451, TSG-RAN WG1#57Bis, Jun. 2009.

Catt, "Design of Backhaul Control Channel for Type I Relay in LTE-A", R1-092781, 3GPP TSG RAN WG1 #57bis, Jun. 2009.

* cited by examiner

METHOD AND APPARATUS FOR TRANSMITTING/RECEIVING A CONTROL FORMAT INDICATOR CHANNEL FOR A RELAY BACKHAUL LINK IN A WIRELESS COMMUNICATION SYSTEM

CROSS-REFERENCE TO RELATED APPLICATIONS

This application is the National Stage filing under 35 U.S.C. 371 of International Application No. PCT/KR2010/004566, filed on Jul. 14, 2010, which claims the benefit of U.S. Provisional Application Ser. Nos. 61/230,111, filed on Jul. 31, 2009, 61/227,076, filed on Jul. 21, 2009, and 61/225,548, filed on Jul. 14, 2009, the contents of which are all incorporated by reference herein in their entirety.

FIELD OF THE INVENTION

The present invention relates to a wireless communication system, and more particularly to a method and apparatus for transmitting and receiving a control format indicator channel for a relay backhaul link in a wireless communication system.

BACKGROUND ART

First, a frame structure and a resource structure of a wireless communication system will hereinafter be described with reference to FIGS. 1 and 2. FIG. 1 is a diagram illustrating a frame structure of a wireless communication system. Referring to FIG. 1, one frame includes 10 subframes, and one subframe includes two slots. A time required to transmit one subframe is defined as a Transmission Time Interval (TTI). For example, one subframe may have a length of 1 ms, and one slot may have a length of 0.5 ms.

One slot may include a plurality of Orthogonal Frequency Division Multiplexing (OFDM) symbols. The OFDM symbol may be referred to as an SC-FDMA symbol or a symbol duration.

One slot may include 7 or 6 OFDM symbols according to a cyclic prefix (CP) length. The Long Term Evolution (LTE) system includes a normal CP and an extended CP. As to the normal CP, one slot may include 7 OFDM symbols. As to the extended CP, one slot may include 6 OFDM symbols. The extended CP is used for a high delay spread.

FIG. 2 shows a resource structure of one DL slot. Referring to FIG. 2, one slot includes 7 OFDM symbols. A resource element (RE) is a resource region including one OFDM symbol and one subcarrier. A resource block (RB) is a resource region including a plurality of OFDM symbols and a plurality of subcarriers. For example, the RB may include 7 OFDM symbols in a time domain and 12 subcarriers in a frequency domain. The number of RBs contained in one slot may be determined according to downlink bandwidth.

FIG. 3 is a diagram showing the structure of a downlink subframe.

Referring to FIG. 3, a maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of downlink control channels used in the LTE system include, for example, a Physical Control Format Indicator Channel (PCFICH), a Physical Downlink Control Channel (PDCCH), a Physical Hybrid automatic repeat request Indicator Channel (PHICH), etc.

The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmission power control command.

The PDCCH transmits a PDSCH transmission format and PDSCH resource allocation information.

In order to extend cell coverage of a mobile communication system and to increase system throughput, multi-hop transmission has been proposed. The multi-hop transmission is a communication method using a relay. The relay is referred to as a relay station (RS), a relay node (RN), etc.

A link between a base station (BS) and a relay node (RN) is referred to as a backhaul link, and a link between a relay node (RN) and a user equipment (UE) is referred to as an access link.

With the development of the relay node (RN), there is a need to define a method for transmitting/receiving a control format indicator channel of a backhaul link.

DETAILED DESCRIPTION OF THE INVENTION

Technical Problem

As described above, with the development of a relay node (RN), it is necessary to define a method for transmitting and receiving a control format indication channel of a backhaul link.

An object of the present invention is to provide a method for transmitting and receiving a control format indicator channel of a backhaul link.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a control format indicator channel for a backhaul link by a base station (BS) of a wireless communication system including generating a relay physical control format indicator channel (R-PCFICH) including information of a relay physical downlink control channel (R-PDCCH) region, and transmitting the R-PCFICH through a first OFDM symbol of the R-PDCCH region.

In another aspect of the present invention, a method for receiving a control format indicator channel for a backhaul link by a user equipment (UE) of a wireless communication system includes receiving a relay physical control format indicator channel (R-PCFICH) including information of a relay physical downlink control channel (R-PDCCH) region through a first OFDM symbol of the R-PDCCH region, and decoding the R-PDCCH using the information of the R-PDCCH region.

In another aspect of the present invention, a base station (BS) for a wireless communication system supporting a relay node (RN) includes a processor for generating a relay physical control format indicator channel (R-PCFICH) including information of a relay physical downlink control channel (R-PDCCH) region, and a transmission module for transmitting the R-PCFICH through a first OFDM symbol of the R-PDCCH region.

In another aspect of the present invention, a user equipment (UE) for a wireless communication system supporting a relay node (RN) includes a reception module for receiving a relay physical control format indicator channel (R-PCFICH) including information of a relay physical downlink control channel (R-PDCCH) region through a first OFDM symbol of the R-PDCCH region, and a processor for decoding the R-PDCCH using the information of the R-PDCCH region.

The R-PCFICH may include an integer number of physical resource blocks (PRBs).

The R-PCFICH may be distributed and mapped on a frequency axis of the first OFDM symbol at regular intervals.

The R-PCFICH may include information regarding the number of OFDM symbols contained in the R-PDCCH region.

The R-PCFICH may be transmitted every subframe.

Effects of the Invention

As is apparent from the above description, a method for transmitting and receiving a control format indicator channel of a backhaul link according to exemplary embodiments of the present invention is defined.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
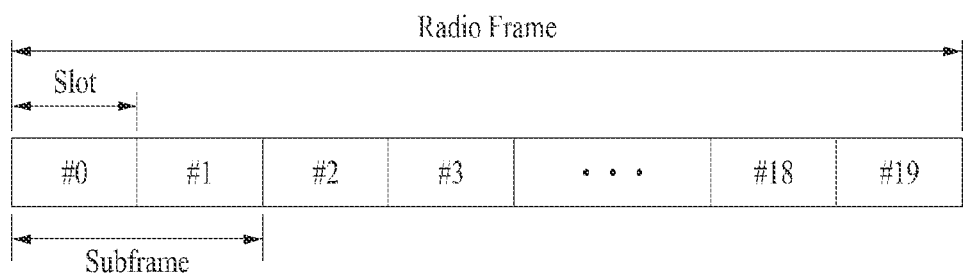
FIG. 1 is a diagram illustrating a frame structure of a wireless communication system.
Figure 2:
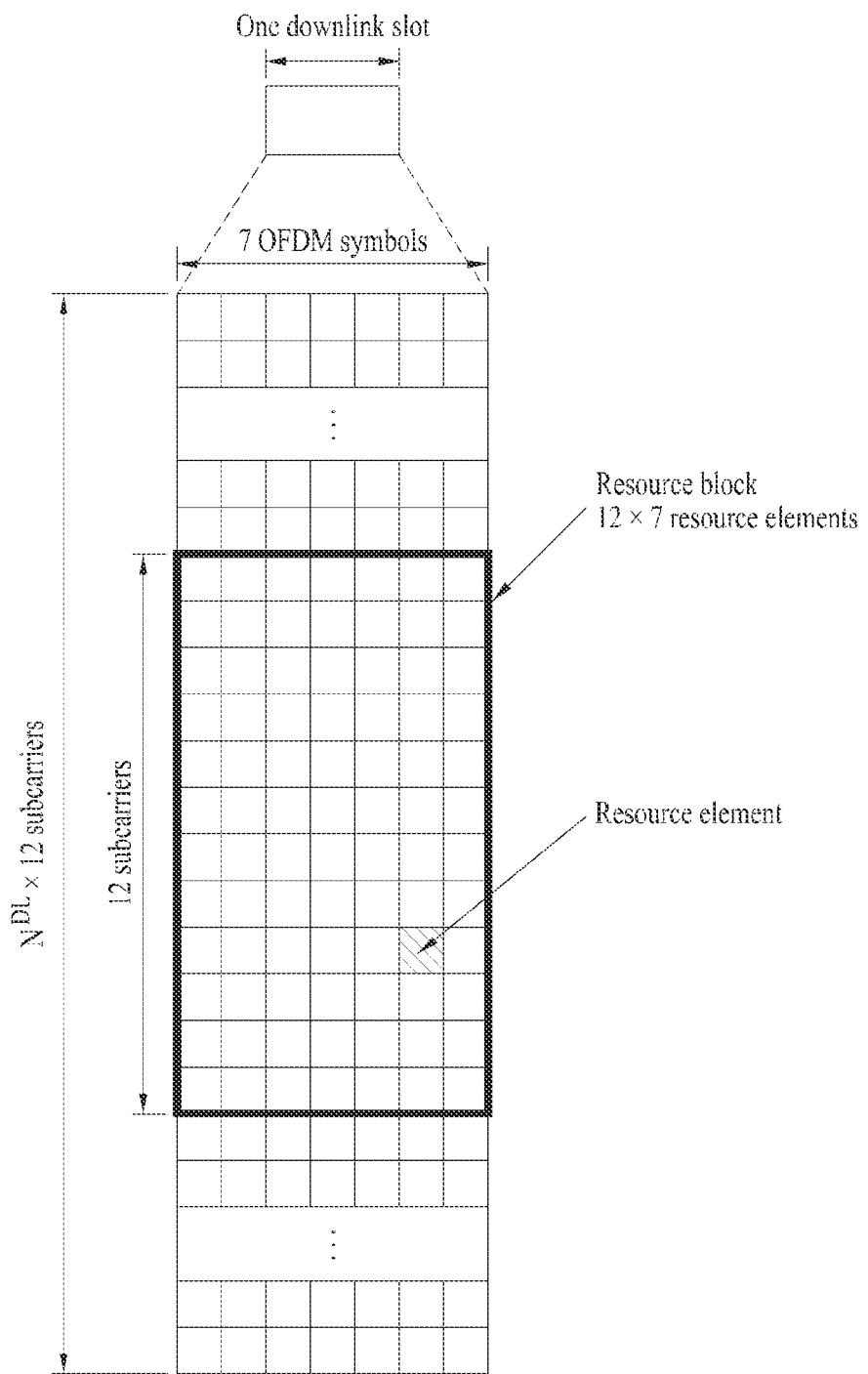
FIG. 2 shows a resource structure of one DL slot.
Figure 3:
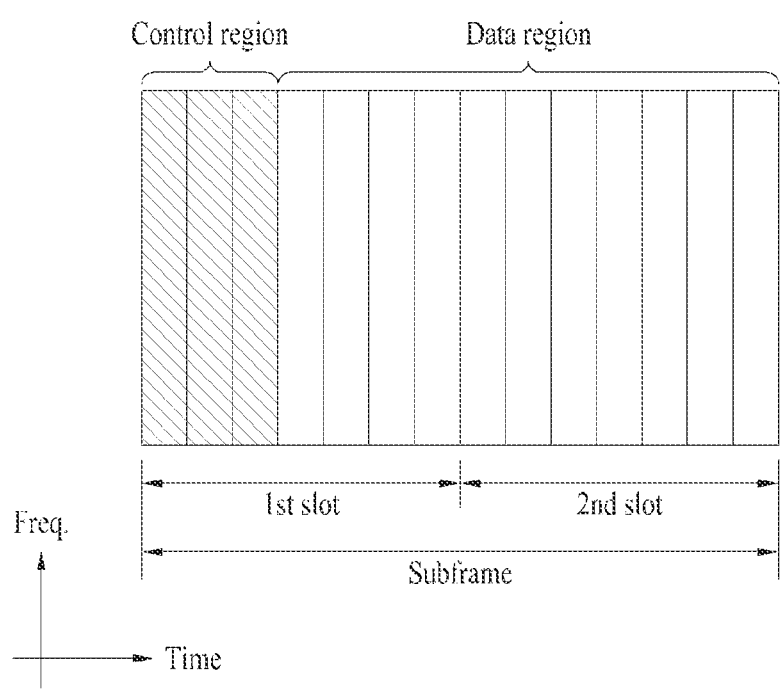
FIG. 3 shows a downlink subframe structure.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP 802.16 system, but the present invention is not limited thereto and the remaining parts of the present invention other than unique characteristics of the 3GPP 802.16 system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, a base station (BS) may refer to an arbitrary node of a network end which communicates with the above terminal, and may include a Node B, eNode B, a base station (BS) and the like.

First, the relay node (RN) will hereinafter be described in detail.

Relays are classified into an L1 relay, an L2 relay, and an L3 relay according to their functionalities in multi-hop transmission.

The L1 relay usually functions as a repeater. Thus, the L1 relay simply amplifies a signal received from a BS or a UE and transmits the amplified signal to the UE or the BS. Because the L1 relay does not decode a received signal, the transmission delay of the signal is short. Despite this benefit, noise is also amplified because the L1 relay does not separate the signal from the noise. To avert this problem, an advanced repeater or smart repeater capable of uplink power control or self-interference cancellation may be used.

The L2 relay may perform a decode-and-forward function. The L2 relay can transmit UE-plane traffic to L2. While the L2 relay does not amplify noise, decoding of the relay unavoidably increases transmission delay.

The L3 relay whose operation is depicted as self-backhauling can transmit an Internet Protocol (IP) packet to L3. As it is equipped with a Radio Resource Control (RRC) function, the L3 layer serves as a small-size BS.

In addition, relays may be classified into a fixed relay node (RN), a nomadic RN, and a mobile RN according to mobility.

The fixed RN is permanently fixed for use in a shadowing area or for coverage extension. The fixed RN may function as a simple repeater. The nomadic RN is temporarily installed when users are rapidly increasing in number, or is movable within a building. The mobile RN can be installed in a public transportation vehicle such as a bus or subway car. Mobility of the RN should be supported.

In addition, the RNs are classified into an inband RN and an outband RN according to links between RNs and networks.

A link between the network and the inband RN is identical to a link between a network and a UE. A link between the network and the outband RN is different from a link between the network and the UE.

With respect to knowledge of existence of a relay node (RN) in a UE, relay nodes (RNs) are classified into a transparent RN and a non-transparent RN. According to the transparent RN, a UE is not aware of whether or not it is communicating with a network via the RN. According to the non-transparent RN, a UE is aware of whether or not it is communicating with a network via the RN.

Figure 4:
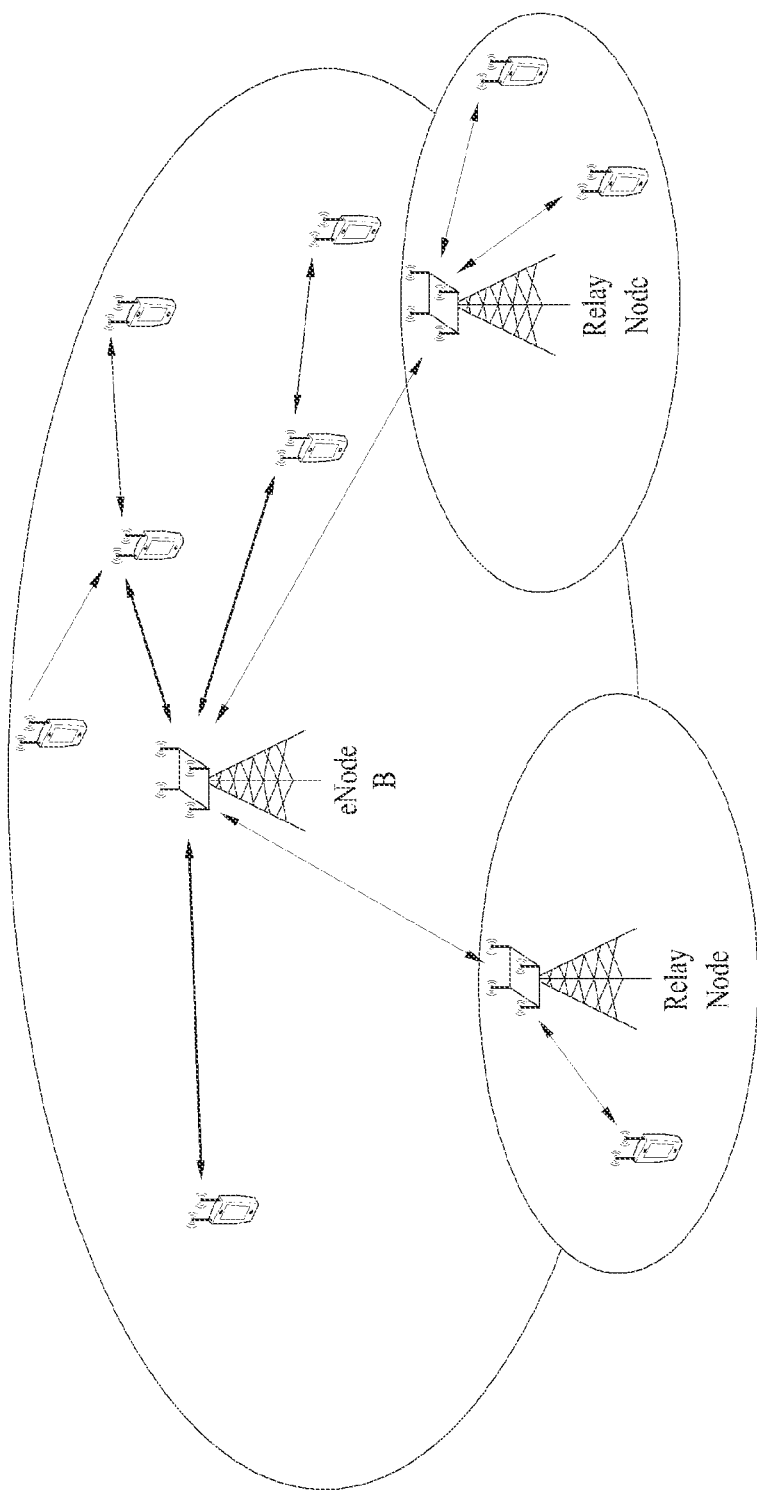
FIG. 4 shows a network including a relay node (RN).

FIG. 4 shows a network including a relay node (RN). As shown in FIG. 4, the basic object of the RN aims to extend a service coverage of the BS or to facilitate the service for the shadowing area.

The relay node (RN) may be regarded as a part of a donor cell covered by a BS. In the case where the relay node (RN) is a part of a donor cell, the relay node does not have its own cell ID because it cannot control its cell and UEs of the cell. Nonetheless, the RN may still have a relay ID. At least part of Radio Resource Management (RRM) is controlled by the BS to which the donor cell belongs, while parts of the RRM may be located in the relay node (RN).

The relay node (RN) can control cells of its own. As such, the relay node (RN) may manage one or more cells and each of the cells may have a unique physical-layer cell ID. The relay node (RN) may have the same RRM function as a BS. From the perspective of a UE, there is no difference between accessing a cell controlled by the relay node and accessing a cell controlled by a normal BS.

In general, a link between the BS and the relay node (RN) is referred to as a backhaul link, and a link between the relay node (RN) and the UE is referred to as an access link.

Next, a control channel of the backhaul link will hereinafter be described in detail.

A subframe available for a backhaul link is semi-statically assigned. A relay physical downlink control channel (R-PDCCH) is a control channel of a backhaul link.

R-PDCCH may be scheduling information of a relay physical downlink shared channel (R-PDSCH) of the corresponding subframe in which R-PDCCH is transmitted, or may also be scheduling information of R-PDSCH of any other subframe other than the subframe used for R-PDCCH transmission from among semi-statically allocated subframes. That is, one R-PDCCH scheduling information may be valid for one or more subframes.

R-PDCCH can dynamically or semi-statically transmit R-PUSCH scheduling information. That is, R-PDCCH may be scheduling information of R-PUSCH transmitted to the corresponding subframe, or may also be scheduling information of R-PUSCH of any other subframe other than the subframe used for R-PDCCH transmission from among semi-statically allocated subframes.

Predetermined physical resource blocks (PRBs) of the subframe can be semi-statically allocated for R-PDCCH transmission. Each R-PDCCH may use the subset of the semi-statically assigned PRBs. In the embodiments of the present invention, PRBs contained in the semi-statically allocated subframe for R-PDCCH transmission is referred to as an R-PDCCH region.

Resources used in the R-PDCCH region according to R-PDCCH load can be dynamically changed in units of an OFDM symbol. Resources not used for R-PDCCH transmission in the R-PDCCH region may be used for R-PDSCH or PDSCH transmission.

Information regarding the R-PDCCH region may be transmitted as cell-specific broadcasting information or cell-specific RRC signaling. There are two kinds of a method for semi-statically establishing the R-PDCCH region, i.e., a method for establishing a localized R-PDCCH region and a method for establishing a distributed R-PDCCH region.

Figure 5:
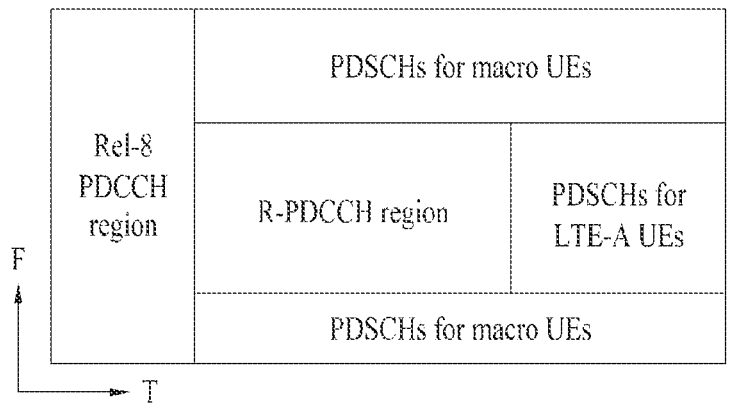
FIG. 5 shows a localized R-PDCCH region.
Figure 6:
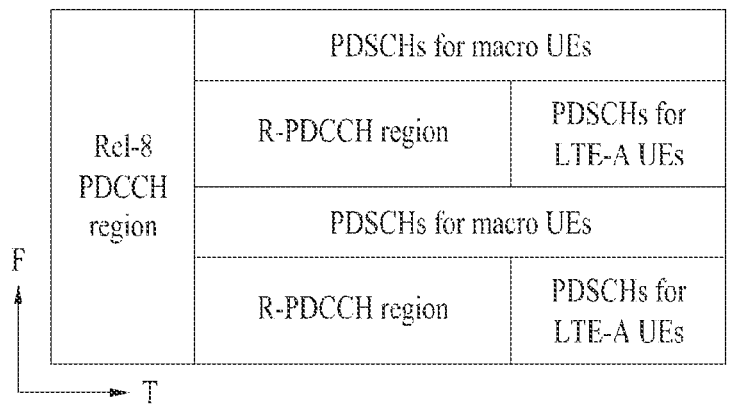
FIG. 6 shows a distributed R-PDCCH region.

FIG. 5 shows a localized R-PDCCH region, and FIG. 6 shows a distributed R-PDCCH region. Referring to FIG. 5, the localized R-PDCCH region includes one or more contiguous PRBs. Referring to FIG. 6, at least one distributed R-PDCCH region includes one or more non-contiguous PRBs.

A relay physical control format indicator channel (R-PCFICH) will hereinafter be described in detail.

PCFICH used in the LTE Rel-8 system is a channel for transmitting information regarding a control region for PDCCH transmission, and indicates how many OFDM symbols are contained in the control region. In the LTE Rel-8 system, the control region includes a maximum of three OFDM symbols.

R-PCFICH serves as a format indicator channel of R-PDCCH. R-PCFICH is a channel for transmitting information regarding R-PDCCH transmission resources, information regarding an R-PDCCH transmission format, etc.

R-PCFICH is used as PCFICH for a relay node, and can transmit information indicating how many OFDM symbols are contained in the R-PDCCH region. In addition, R-PCFICH may indicate configuration of an actual PRB used by R-PDCCH on a frequency axis, and may include an index depending upon the increasing PRB according to a predetermined rule. For example, when a default value or a minimum value is determined, R-PCFICH may indicate the increasing PRB using a multiple of a default or minimum value. In other words, R-PCFICH can transmit resource information of at least one domain from among time and frequency domains occupied by the R-PDCCH region.

If R-PCFICH is needed, R-PCFICH configuration and an R-PCFICH transmission method according to an embodiment of the present invention will hereinafter be described in detail.

If the R-PDCCH region of a frequency axis is notified through semi-static signaling, R-PCFICH can indicate the R-PDCCH region of a time axis. The R-PDCCH region of the frequency axis is semi-statically fixed and the R-PDCCH region of the time axis is variable, R-PCFICH indicates the R-PDCCH region of the time axis. Therefore, R-PCFICH may be information indicating how many OFDM symbols are used by the R-PDCCH region, and may transmit information regarding the R-PDCCH region of the time axis in units of one OFDM symbol in the same manner as in a PCFICH for macro UEs.

While the PDCCH region of macro UEs is transmitted over the entire system bandwidth, the R-PDCCH region is transmitted through limited PRBs. Thus, in order to indicate the R-PDCCH region in units of an OFDM symbol, many more bit numbers may be requested. While the PDCCH region of macro UEs uses a maximum of 3 OFDM symbols, the R-PDCCH region of relay nodes are transmitted on a limited frequency axis, such that there is a high probability of using three or more OFDM symbols.

PCFICH indicating the PDCCH region of macro UEs uses 2 bits to express a maximum of 3 OFDM symbols. The PCFICH supports the 1/16 coding rate and uses QPSK modulation, such that it uses 16 resource elements (REs).

Provided that the remaining 11 OFDM symbols other than the macro PDCCH region in a normal cyclic prefix (CP) subframe are used as the R-PDCCH region, R-PCFICH requires 4 bits. In addition, R-PCFICH must be coded at a low coding rate in such a manner that R-PCFICH can be received by all relay nodes or LTE-A UEs. As a result, the amount of resources used for R-PCFICH transmission is about double that of PCFICH.

In order to minimize bits and resources used for R-PCFICH transmission as well as to effectively indicate the R-PDCCH region, two or more OFDM symbol units may be grouped to indicate the R-PDCCH region. Table 1 shows one case for indicating the R-PDCCH region by grouping two OFDM symbol units and another case for indicating the R-PDCCH region by grouping three OFDM symbol units.

TABLE 1

| Bit representation | OFDM symbols for R-PDCCH transmission (indication in units of 2 OFDM symbols) | OFDM symbols for R-PDCCH transmission (indication in units of 3 OFDM symbols) |
|---|---|---|
| 0 | 3rd, 4th | 3rd, 4th, 5th |
| 1 | 5th, 6th | 6th, 7th, 8th |
| 2 | 7th, 8th | All symbols (9th, 10th, 11th) |
| 3 | All symbols (9th, 10th, 11th) | Reserved |

If the amount of information indicated by R-PCFICH is 2 states, one state may indicate a predetermined number of OFDM symbols, and the other state may indicate all OFDM symbols or OFDM symbols available in the first or second slot of a macro subframe.

If the amount of information indicated in Table 1 is 4 states, the corresponding value may be determined to be a predetermined number of OFDM symbols as shown in Table 1, or it is also possible to determine the number of OFDM symbols to be non-uniformly used. For example, each state may indicate one OFDM symbol, two OFDM symbols, three OFDM symbols, all the subframes, or one slot. Therefore, when defining a relay zone according to the number of relay nodes, it is possible to efficiently use resources.

Although Table 1 shows a normal CP subframe on the condition that a macro PDCCH is transmitted using a maximum of 3 OFDM symbols, it should be noted that Table 1 can also be equally applied to the amount of a macro PDCCH region or the extended CP subframe, etc.

Figure 7:
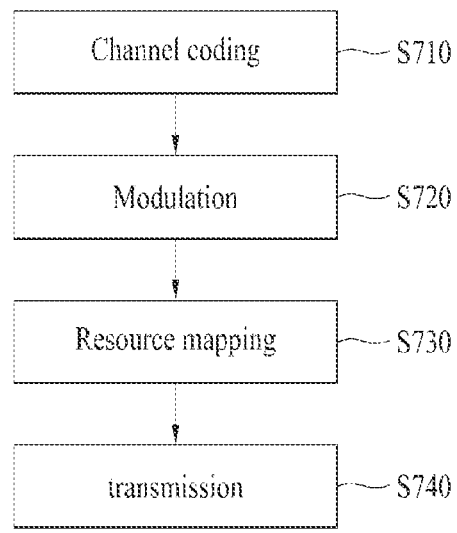
FIG. 7 is a flowchart illustrating a method for transmitting an R-PCFICH according to an embodiment of the present invention.

FIG. 7 is a flowchart illustrating a method for transmitting an R-PCFICH according to an embodiment of the present invention.

Referring to FIG. 7, a base station (BS) performs channel coding of R-PDCCH information in step S710, and modulates the channel-coded result in step S720.

The base station (BS) can transmit R-PCFICH on a PRB basis in consideration of PRB-based multiplexing of R-PDCCH and R-PDSCH in the R-PDCCH and R-PDSCH regions.

For example, R-PDCCH information is composed of 2 bits, 1/24 channel coding is performed. If QPSK modulation is performed, R-PCFICH composed of 2 PRBs is created. As a result, R-PCFICH composed of 2 PRBs can be separately transmitted in units of one PRB.

In another example, if R-PDCCH information is 3 bits, the 1/16 channel coding is performed. If QPSK modulation is performed, R-PCFICH composed of 2 PRBs is created. As a result, R-PCFICH composed of 2 PRBs can be separately transmitted in units of one PRB.

In another example, if R-PDCCH information is 2 bits, the 1/12 channel coding is performed. If QPSK modulation is performed, R-PCFICH composed of one PRB is created.

Although the above-mentioned description shows that R-PDCCH information composed of 2 or 3 bits is channel-coded with the 1/12 to 1/24 coding rates so as to generate R-PCFICH composed of one or two PRBs, the present invention may include all kinds of examples in which other-sized information bits are channel-coded with a different coding rate and R-PCFICH composed of different numbers of PRBs can be generated using different modulation schemes.

Provided that n is an integer of 1 or higher and R-PCFICH is composed of n PRBs, each of n PRBs can be transmitted in a distributed format in an R-PDCCH region or data resource region so as to obtain frequency diversity. The distributed format indicates that data is transmitted on a frequency axis at intervals of a predetermined time in the same manner as in PCFICH transmission of the legacy Rel-8 system.

Alternatively, if R-PCFICH is contained in a specific control channel element (CCE) of a macro PDCCH region, data can be transmitted using REG (Resource Element Group)-based interleaving in the same manner as in the legacy method.

In addition, R-PCFICH can be RN-specific-cyclic-shifted.

The base station (BS) maps the generated R-PCFICH to a resource region in step S730, and transmits the mapped result in step S740.

R-PCFICH is information commonly used in all relay nodes belonging to one base station (BS), such that it can be defined as cell-specific information.

R-PCFICH can be transmitted through the R-PDCCH region, the macro PDCCH region, or the data region.

R-PCFICH can be transmitted through a fixed region of the R-PDCCH region. R-PCFICH is a channel indicating resource information of a time axis of the R-PDCCH region. In order to transmit R-PCFICH information within a variable time domain, the R-PCFICH information can always be transmitted through a first OFDM symbol of the R-PDCCH region. In addition, in order to obtain the frequency diversity, the base station (BS) may distribute and map the R-PCFICH on a frequency axis at regular intervals.

Alternatively, it may also be possible to use the legacy PCFICH mapping method using only the scaling based on a bandwidth of the R-PDCCH region.

The base station (BS) may transmit R-PCFICH through the macro PDCCH region in such a manner that the R-PCFICH is not located in a variable R-PDCCH region. In order to transmit R-PCFICH through the macro PDCCH region, the R-PCFICH must be transmitted using a CCE unit used in the macro PDCCH region. For R-PCFICH reliability, the R-PCFICH can be transmitted using a relatively high aggregate level such as 4 or 8. In order to transmit the R-PCFICH to the macro PDCCH region, using one or more CCEs contained in a UE specific search space may be preferable to guarantee a common search space. For R-PCFICH transmission, a specific CCE index may be fixedly used in a search space of the macro PDCCH region. CCEs for constructing a PDCCH in the macro PFCCH region is distributed into the entire system bandwidth and the time domain of the PDCCH region and then transmitted, such that R-PCFICH is transmitted using one or more aggregated CCEs, resulting in the frequency and time diversity effects.

R-PCFICH may be transmitted through a data resource region. The data resource region is composed of the remaining OFDM symbols other than the macro PDCCH transmission region, and may indicate a PDSCH transmission region. In this case, since resources not used for R-PDCCH transmission in the R-PDCCH region can be used for PDSCH transmission of relay nodes or LTE-A UEs, the region allocated to the R-PDCCH region may or may not be contained in the data resource region.

The base station (BS) can transmit R-PCFICH through one or more specific OFDM symbols from among OFDM symbols of the data resource region, such that all the relay nodes can receive the R-PCFICH without ambiguity regarding the position of the data resource region to which R-PCFICH is transmitted on various subframe configurations that are capable of including different numbers of OFDM symbols according to CP length and the like.

For example, R-PCFICH can be transmitted using the last OFDM symbol from among OFDM symbols of the data resource region. R-PCFICH may also be transmitted using the first OFDM symbol from among OFDM symbols of the data resource region. Alternatively, R-PCFICH may be transmitted using the $12^{th}$ OFDM symbol from among OFDM symbols of the data resource region.

In this case, priority of REs used for R-PCFICH transmission may be located before all other resource allocation. That is, if some parts of REs of the R-PCFICH overlap with the region of macro UEs of a frequency band different from the R-PDCCH region, resources of the macro UEs can be punctured. In addition, if some parts of REs of the R-PCFICH overlap with the R-PDCCH region, resources of the R-PDCCH region may be punctured or the rate matching may be performed in consideration of RE positions of the R-PCFICH in the R-PDCCH region.

If the R-PDCCH region is dynamically changed on a subframe basis or is semi-dynamically changed at intervals of a predetermined time, R-PCFICH may be transmitted on a subframe basis or on a specific period basis. That is, R-PCFICH can be dynamically transmitted for each subframe for dynamic R-PDCCH region allocation. Alternatively, under the condition that R-PDCCH region allocation is not dynamically changed for each subframe, R-PCFICH can be semi-dynamically transmitted at intervals of a specific time for semi-dynamic R-PDCCH region allocation. In this case, the specific period may be identical to a dynamic period of the R-PDCCH region.

Alternatively, if R-PDCCH is not transmitted at every subframe, R-PCFICH need not be transmitted at every subframe, such that the R-PCFICH may also be transmitted to a subframe to which R-PDCCH is transmitted.

R-PCFICH may indicate information of the R-PDCCH region of a subframe shifted by a specific offset, instead of indicating information of the R-PDCCH region of the corresponding subframe. That is, if R-PCFICH is transmitted at the $n^{th}$ subframe, R-PDCCH allocation information of the R-PCFICH may be valid for the $(n+k)^{th}$ subframe. Alternatively, the R-PDCCH allocation information of the R-PCFICH may be valid for subframes ranging from the $(n+k)^{th}$ subframe to the next-period subframe.

If the R-PDCCH region is semi-statically allocated, R-PCFICH may be transmitted through higher layer signaling such as cell-specific or RN-specific RRC signaling. Instead of transmitting the R-PCFICH as an actual physical channel, a method for transmitting information R-PCFICH transmission information through higher layer signaling may be used.

Inter-cell interference randomization effect can be achieved by applying cell-specific shift or cell-specific scrambling to R-PCFICH transmission. The cell-specific shift or cell-specific scrambling may be applied to any of the coded bit level, the modulated symbol level, and the resource mapping level.

The base station (BS) may not indicate the R-PDCCH region of the frequency axis through semi-static signaling, or may indicate R-PDCCH regions of the frequency and time axes through R-PCFICH.

R-PDCCH region information of the frequency axis may be either a set of PRBs corresponding to the R-PDCCH region or indexes of PRBs corresponding to the R-PDCCH region. Assuming that a predetermined number of PRB units are designated, the R-PDCCH region information may be a PRB unit corresponding to the R-PDCCH region.

R-PDCCH region information of the time axis may be the number of OFDM symbols corresponding to the R-PDCCH region. In this case, the number of OFDM symbols may be represented in units of one OFDM symbol, or may also be represented in units of a predetermined number of OFDM symbols as shown in Table 1.

Alternatively, the base station (BS) may simultaneously display time-axis resource information and frequency-axis resource information in the form of a table, and may perform signaling of a mode. For example, Mode 0 indicates that n PRBs are allocated on a frequency axis and one OFDM symbol is allocated on a time axis.

In case of a localized R-PDCCH region, R-PCFICH may be transmitted in the corresponding R-PDCCH region. In case of a distributed R-PDCCH region, R-PCFICH including the corresponding R-PDCCH information may be transmitted in each R-PDCCH region.

Next, an exemplary case for which R-PCFICH is not required will hereinafter be described in detail.

If information of the R-PDCCH regions of the frequency axis and the time axis is transmitted through semi-static signaling, or if information of the R-PDCCH region of the frequency axis is transmitted through semi-static signaling and the R-PDCCH region of the time axis is always fixed, R-PCFICH need not be used.

However, for a stable operation of a specific relay node, it is preferable that R-PDCCH be configured in the form of time division multiplexing (TDM). For example, if it is necessary to search for the R-PDCCH region to recognize specific system information, a constant position must be provided irrespective of the size of the actually used R-PDCCH region. For this purpose, the PDCCH search space for recognizing system information needs to be equally constructed irrespective of definition of the actual R-PDCCH region.

In addition, assuming that scalability is defined, when constructing the R-PDCCH in response to the increasing number of relay nodes, it is preferable that an actual search space be constructed/increased in a TDM format. As a result, although there occurs an unexpected problem caused by quality deterioration of a backhaul link, the relay node can easily recover the link.

Next, RN-specific R-PDCCH region and associated RN-specific R-PCFICH transmission will hereinafter be described in detail.

If the R-PDCCH region is RN-specifically allocated for each relay node (RN), R-PCFICH can transmit information of the RN-specific R-PDCCH region. If frequency-axis resource information of the RN-specific R-PDCCH region is semi-statically constructed, information contained in the R-PCFICH may be the number of OFDM symbols used by the RN-specific R-PDCCH region. If frequency-axis resource information of the RN-specific R-PDCCH region is not semi-statically constructed, both the frequency-axis resource information and the time-axis resource information of the RN-specific R-PDCCH region may be transmitted over R-PCFICH. In addition, information capable of being transmitted over RN-specific R-PCFICH is as follows.

If individual RN-specific R-PDCCH transmission resources are determined, resource setup information of RN-common control information may be transmitted over the RN-specific R-PCFICH.

When determining RN-specific R-PDCCH transmission resources, information regarding RN-specific R-PDCCH transmission resources can be transmitted over R-PCFICH. Information regarding RN-specific R-PDCCH transmission resources may be frequency resource information, time resource information, or information regarding the frequency and time resources.

If an uplink grant is present, construction information of a combination of downlink and uplink grants, uplink backhaul subframe construction information indicating application or non-application of R-PUCCH on an uplink subframe setup, and format information of the RN-specifically transmitted R-PDCCH may be transmitted over R-PCFICH. The format information of the RN-specifically transmitted R-PDCCH may be information of an R-CCE aggregation level used for R-PDCCH transmission or information of the search space used for R-PDCCH transmission.

In case of transmitting the RN-specific R-PCFICH, R-PCFICH can be transmitted using scrambling based on a relay node ID (RN-ID), such that the remaining relay nodes (RNs) other than a relay node (RN) corresponding to the R-PCFICH are unable to decode the corresponding R-PCFICH. RN-specific R-PCFICH is transmitted using the RN-ID based cyclic shift, interference of R-PCFICH transmission can be minimized.

It should be noted that the RN-common R-PCFICH transmission method disclosed in the embodiments of the present invention can also be applied to RN-specific R-PCFICH.

Figure 8:
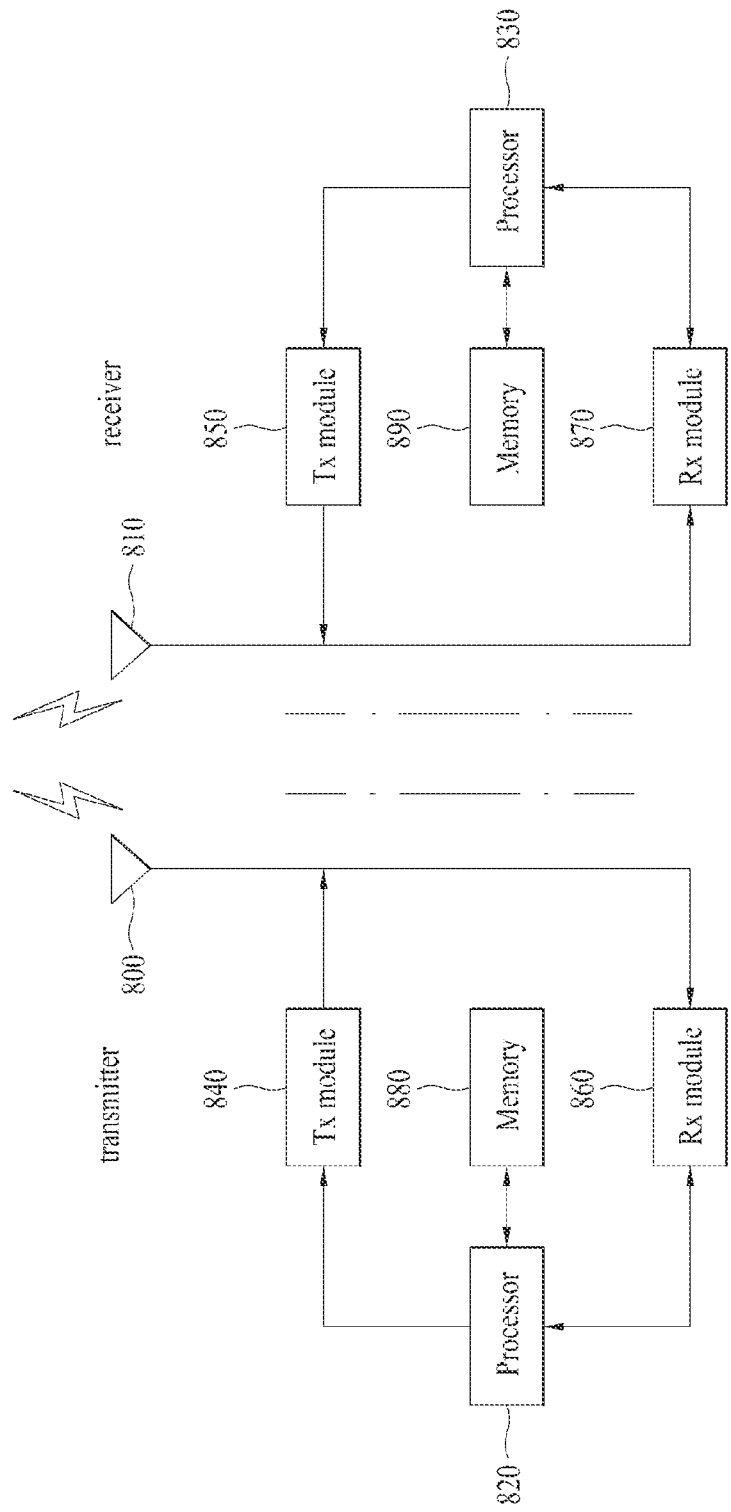
FIG. 8 is a block diagram illustrating a user equipment (UE) and a base station (BS) applicable to embodiments of the present invention.

FIG. 8 is a block diagram illustrating detailed constituent components of a user equipment (UE) and a base station (BS) that can be implemented through the above-mentioned embodiments.

Referring to FIG. 8, each of the UE (also called 'AMS') and the BS (also called 'ABS') may include an antenna 800 or 810 for transmitting and receiving information, data, signals and/or messages, a Transmission (Tx) module 840 or 850 for transmitting messages by controlling the antenna 800 or 810, a Reception (Rx) module 860 or 870 for receiving messages by controlling the antenna 800 or 810, a memory 880 or 890 for storing information related to BS communication, and a processor 820 or 830 for controlling the memory 880 or 890. In this case, the BS may be a femto BS (FBS) or a macro BS (MBS). The components of the UE are the counter parts of those of the BS. The components of the transmitter and the receiver will be described below in more detail.

The antennas 800 and 810 include Tx antennas for transmitting signals generated from Tx modules 840 and 850 and Rx antennas for receiving radio frequency (RF) signals and providing the received RF signals to the Rx modules 860 and 870. If Multiple Input Multiple Output (MIMO) is supported, two or more antennas may be provided.

The processors 820 and 830 generally provide overall control to the UE and the BS, respectively. Especially, the processors 820 and 830 may perform a control function for implementing the above-described exemplary embodiments of the present invention, a variable MAC frame control function based on service characteristics and a propagation environment, a handover function, an authentication and encryption function, etc. In addition, each of the processors 820 and 830 may include an encryption module for controlling encryption of various messages and a timer module for controlling transmission and reception of various messages.

The processor 820 of the BS generates R-PCFICH including information regarding the R-PDCCH region. That is, the processor 820 channel-codes information of the R-PDCCH region, modulates the channel-coded resultant information, and maps the modulated resultant information to resources.

The processor 830 of the UE decodes R-PDCCH using the R-PDCCH region information received from the BS.

The Tx modules 840 and 850 may encode and modulate transmission data scheduled by the processors 820 and 830 according to a predetermined coding and modulation scheme and provide the modulated data to the antennas 800 and 810.

The Tx module 840 of the BS transmits R-PCFICH. R-PCFICH may be transmitted over the R-PDCCH region, the macro PDCCH region, or the data region.

R-PCFICH may be transmitted over a first OFDM symbol of the R-PDCCH region. In order to obtain the frequency diversity, the BS may distribute and map the R-PCFICH on a frequency axis at regular intervals.

Alternatively, the BS may transmit R-PCFICH not only over the macro PDCCH region but also over the data resource region.

The Rx modules 860 and 870 may recover original data by demodulating and decoding data received through the antennas 800 and 810 and provide the recovered data to the processors 820 and 830.

The Rx module 870 of the UE may receive R-PCFICH including R-PDCCH region information through a first OFDM symbol of the R-PDCCH region.

The memories 880 and 890 may store programs for processing and control of the processors 820 and 830 and temporarily store input/output data (on the side of the UE, an uplink grant received from the BS, system information, a station identifier (STID), a flow identifier (FID), an action time, area assignment information, frame offset information and the like).

Each of the memories 880 and 890 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The invention claimed is:

1. A method for transmitting a control format indicator channel for a backhaul link between a base station (BS) and a relay node (RN) by the BS of a wireless communication system, the method comprising:
   generating a relay physical control format indicator channel (R-PCFICH) including information of a relay physical downlink control channel (R-PDCCH) region, the R-PDCCH region being included in a data region of a downlink subframe; and
   transmitting the R-PCFICH through a first OFDM symbol of the R-PDCCH region;
   wherein the R-PCFICH includes information regarding the number of OFDM symbols contained in the R-PDCCH region;
   wherein the R-PCFICH is distributed and mapped on a frequency axis of the first OFDM symbol of the R-PDCCH region at a predetermined interval; and
   wherein the R-PCFICH carries an indicator (A) for indicating the information regarding the number of OFDM symbols contained in the R-PDCCH region, wherein correspondence between the indicator (A) and OFDM symbols contained in the R-PDCCH region is defined by a table as follows:

TABLE

| indicator (A) | OFDM symbols for the R-PDCCH region (in units of 2 OFDM symbols) | OFDM symbols for the R-PDCCH region (in units of 3 OFDM symbols) |
|---|---|---|
| 0 | $3^{rd}$ and $4^{th}$ OFDM symbols | $3^{rd}$, $4^{th}$ and $5^{th}$ OFDM symbols |
| 1 | $5^{th}$ and $6^{th}$ OFDM symbols | $6^{th}$, $7^{th}$ and $8^{th}$ OFDM symbols |
| 2 | $7^{th}$ and $8^{th}$ OFDM symbols | All symbols |
| 3 | All symbols | reserved. |

2. The method according to claim 1, wherein the R-PCFICH includes an integer number of physical resource blocks (PRBs).

3. The method according to claim 1, wherein the information regarding the number of OFDM symbols is represented in units of one OFDM symbol or units of a predetermined number of OFDM symbols.

4. The method according to claim 1, wherein the R-PCFICH is transmitted every subframe.

5. A method for receiving a control format indicator channel for a backhaul link between a base station (BS) and a relay node (RN) by a relay node (RN) of a wireless communication system, the method comprising:
receiving a relay physical control format indicator channel (R-PCFICH) including information of a relay physical downlink control channel (R-PDCCH) region through a first OFDM symbol of the R-PDCCH region, the R-PDCCH region being included in a data region of a downlink subframe; and
decoding the R-PDCCH using the information of the R-PDCCH region wherein the R-PCFICH includes information regarding the number of OFDM symbols contained in the R-PDCCH region;
wherein the R-PCFICH is distributed and mapped on a frequency axis of the first OFDM symbol of the R-PDCCH region at a predetermined interval; and
wherein the R-PCFICH carries an indicator (A) for indicating the information regarding the number of OFDM symbols contained in the R-PDCCH region, wherein correspondence between the indicator (A) and OFDM symbols contained in the R-PDCCH region is defined by a table as follows:

TABLE

| indicator (A) | OFDM symbols for the R-PDCCH region (in units of 2 OFDM symbols) | OFDM symbols for the R-PDCCH region (in units of 3 OFDM symbols) |
|---|---|---|
| 0 | $3^{rd}$ and $4^{th}$ OFDM symbols | $3^{rd}$, $4^{th}$ and $5^{th}$ OFDM symbols |
| 1 | $5^{th}$ and $6^{th}$ OFDM symbols | $6^{th}$, $7^{th}$ and $8^{th}$ OFDM symbols |
| 2 | $7^{th}$ and $8^{th}$ OFDM symbols | All symbols |
| 3 | All symbols | reserved. |

6. The method according to claim 5, wherein the R-PCFICH includes an integer number of physical resource blocks (PRBs).

7. The method according to claim 5, wherein the information regarding the number of OFDM symbols is represented in units of one OFDM symbol or units of a predetermined number of OFDM symbols.

8. The method according to claim 5, wherein the R-PCFICH is transmitted every subframe.

9. A base station (BS) for a wireless communication system supporting a relay node (RN) through a backhaul link between the BS and the RN comprising:
a processor for generating a relay physical control format indicator channel (R-PCFICH) including information of a relay physical downlink control channel (R-PDCCH) region, the R-PDCCH region being included in a data region of a downlink subframe; and
a transmission module for transmitting the R-PCFICH through a first OFDM symbol of the R-PDCCH region;
wherein the R-PCFICH includes information regarding the number of OFDM symbols contained in the R-PDCCH region;
wherein the R-PCFICH is distributed and mapped on a frequency axis of the first OFDM symbol of the R-PDCCH region at a predetermined interval; and
wherein the R-PCFICH carries an indicator (A) for indicating the information regarding the number of OFDM symbols contained in the R-PDCCH region, wherein correspondence between the indicator (A) and OFDM symbols contained in the R-PDCCH region is defined by a table as follows:

TABLE

| indicator (A) | OFDM symbols for the R-PDCCH region (in units of 2 OFDM symbols) | OFDM symbols for the R-PDCCH region (in units of 3 OFDM symbols) |
|---|---|---|
| 0 | $3^{rd}$ and $4^{th}$ OFDM symbols | $3^{rd}$, $4^{th}$ and $5^{th}$ OFDM symbols |
| 1 | $5^{th}$ and $6^{th}$ OFDM symbols | $6^{th}$, $7^{th}$ and $8^{th}$ OFDM symbols |
| 2 | $7^{th}$ and $8^{th}$ OFDM symbols | All symbols |
| 3 | All symbols | reserved. |

10. The base station (BS) according to claim 9, wherein the R-PCFICH includes an integer number of physical resource blocks (PRBs).

11. The base station (BS) according to claim 9, wherein the information regarding the number of OFDM symbols is represented in units of one OFDM symbol or units of a predetermined number of OFDM symbols.

12. The base station (BS) according to claim 9, wherein the R-PCFICH is transmitted every subframe.

13. A relay node (RN) for a wireless communication system supporting a backhaul link between a base station BS and the RN comprising:
a reception module for receiving a relay physical control format indicator channel (R-PCFICH) including information of a relay physical downlink control channel (R-PDCCH) region through a first OFDM symbol of the R-PDCCH region, the R-PDCCH region being included in a data region of a downlink subframe; and
a processor for decoding the R-PDCCH using the information of the R-PDCCH region;
wherein the R-PCFICH includes information regarding the number of OFDM symbols contained in the R-PDCCH region;
wherein the R-PCFICH is distributed and mapped on a frequency axis of the first OFDM symbol of the R-PDCCH region at a predetermined interval; and
wherein the R-PCFICH carries an indicator (A) for indicating the information regarding the number of OFDM symbols contained in the R-PDCCH region, wherein correspondence between the indicator (A) and OFDM symbols contained in the R-PDCCH region is defined by a table as follows:

TABLE

| indicator (A) | OFDM symbols for the R-PDCCH region (in units of 2 OFDM symbols) | OFDM symbols for the R-PDCCH region (in units of 3 OFDM symbols) |
| --- | --- | --- |
| 0 | $3^{rd}$ and $4^{th}$ OFDM symbols | $3^{rd}$, $4^{th}$ and $5^{th}$ OFDM symbols |
| 1 | $5^{th}$ and $6^{th}$ OFDM symbols | $6^{th}$, $7^{th}$ and $8^{th}$ OFDM symbols |
| 2 | $7^{th}$ and $8^{th}$ OFDM symbols | All symbols |
| 3 | All symbols | reserved. |

14. The relay node (RN) according to claim 13, wherein the R-PCFICH includes an integer number of physical resource blocks (PRBs).

15. The relay node (RN) according to claim 13, wherein the information regarding the number of OFDM symbols is represented in units of one OFDM symbol or units of a predetermined number of OFDM symbols.

16. The relay node (RN) according to claim 13, wherein the R-PCFICH is transmitted every subframe.

\* \* \* \* \*